United States Patent [19]

Ragle et al.

[11] 4,086,641

[45] Apr. 25, 1978

[54] PARTITIONABLE PORTABLE FLEXIBLE DISK PACK

[75] Inventors: Herbert Underwood Ragle, Thousand Oaks; Dean DeMoss, Camarillo, both of Calif.

[73] Assignee: Burroughs Corporation, Detroit, Mich.

[21] Appl. No.: 766,288

[22] Filed: Feb. 7, 1977

Related U.S. Application Data

[63] Continuation-in-part of Ser. No. 711,647, Aug. 4, 1976.

[51] Int. Cl.² .................. G11B 23/02; G11B 25/04
[52] U.S. Cl. .................................. 360/133; 360/99; 209/110.5
[58] Field of Search ............. 360/133, 135, 97–99; 206/444; 346/134, 137; 209/80.5; 40/152.2, 158 B; 358/128

[56] References Cited

U.S. PATENT DOCUMENTS

| | | | |
|---|---|---|---|
| 1,360,617 | 11/1920 | Brand | 209/110.5 |
| 3,931,644 | 1/1976 | Ward | 360/99 X |
| 3,947,885 | 3/1976 | McGinnis et al. | 360/98 |
| 3,961,656 | 6/1976 | Aggarwal | 274/47 |

OTHER PUBLICATIONS

IBM Technical Disclosure Bulletin, vol. 19, No. 1, June 1976, p. 171.

*Primary Examiner*—John H. Wolff
*Attorney, Agent, or Firm*—John J. McCormack; Nathan Cass; Kevin R. Peterson

[57] ABSTRACT

Improved disk pack media for data storage illustrated as comprising a pack of flexible magnetic recording disks perforated for partitioning and adapted for stacking each in a different respective rotational orientation to facilitate partitioning. All disks are hole-encoded in a common pattern, then stacked to dispose each in a unique rotational "misregistration" relative to all others — thereby opening-up and/or closing-off adjacent "partition bores" and permitting associated automatic apparatus to selectively partition the pack and expose any desired disk-side for operation thereon.

19 Claims, 28 Drawing Figures

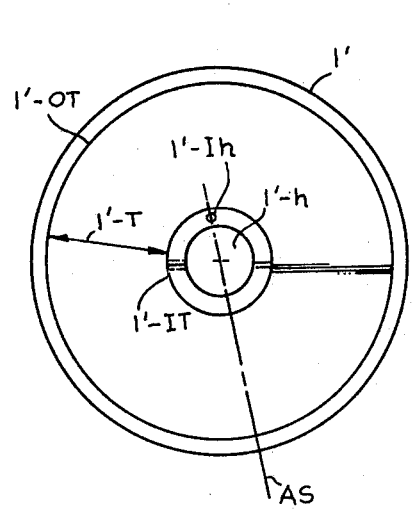
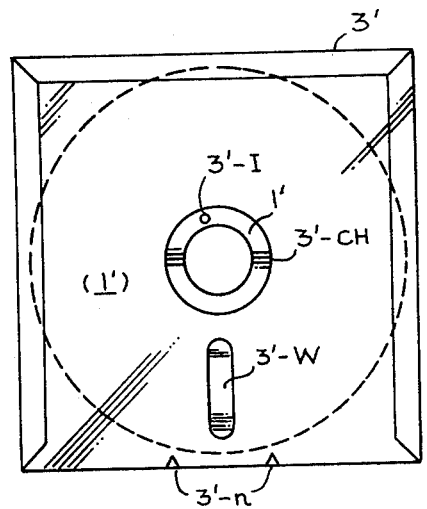
PRIOR ART
Fig. 1
Fig. 2
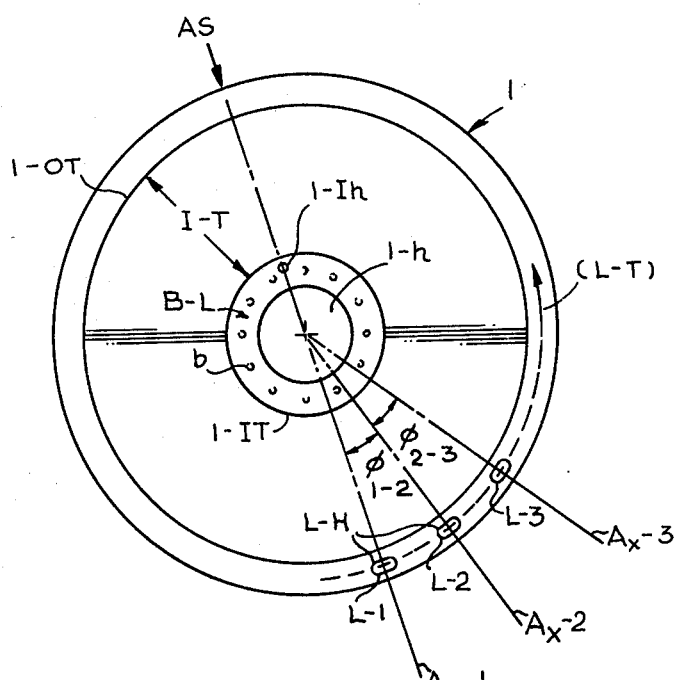
Fig. 3

| TABLE I HOLE REGISTRATION (REF FIG 15) ||||||||
|---|---|---|---|---|---|---|---|
| PARTITION-SITE (ALONG PARTITION RADII) | VIII | IX | X | I | II | III | --- VII |
| DISK # 10' | $h_8$ | $h_9$ | $h_{10}$ | $h_1$ | $h_2$ | $h_3$ | --- $h_7$ |
| 9' | $h_9$ | $h_{10}$ | X $h_1$) | $h_2$ | $h_3$ | $h_4$ | --- $h_8$ |
| 8' | $h_{10}$ | X $h_1$) | | $h_3$ | $h_4$ | $h_5$ | --- $h_9$ |
| 7' | X $h_1$) | | | $h_4$ | $h_5$ | $h_6$ | --- $h_{10}$ |

O : INDICATES DEPTH OF PARTITION-BORES, BLOCKED
△ : INDICATES INTER-SITE "DEADSPOTS" WHERE HOLES ARE SHIFTED OUT OF SITE-REGISTRY TO CREATE A BORE TERMINATION

*Fig. 18*

| TABLE II (REF FIG 15) |||||||||||
|---|---|---|---|---|---|---|---|---|---|---|
| SELECT SITES | I | II | III | IV | V | VI | VII | VIII | IX | X (PARTITION PLANES) |
| DISK # 10' | 1 | 2 | 3 | 4 | 5 | 6 | 7 | 8 | 9 | 10 |
| 9' | 2 | 3 | 4 | 5 | 6 | 7 | 8 | 9 | 10 | /(1 |
| 8' | 3 | 4 | 5 | 6 | 7 | 8 | 9 | 10 | /(1 | /(2 |
| 7' | 4 | 5 | 6 | 7 | 8 | 9 | 10 | /(1 | /(2 | /(3 |
| 6' | 5 | 6 | 7 | 8 | 9 | 10 | /(1 | /(2 | /(3 | /(4 |
| 5' | 6 | 7 | 8 | 9 | 10 | /(1 | /(2 | /(3 | /(4 | /(5 |
| 4' | 7 | 8 | 9 | 10 | /(1 | /(2 | /(3 | /(4 | /(5 | /(6 |
| 3' | 8 | 9 | 10 | /(1 | /(2 | /(3 | /(4 | /(5 | /(6 | /(7 |
| 2' | 9 | 10 | /(1 | /(2 | /(3 | /(4 | /(5 | /(6 | /(7 | /(8 |
| 1' | 10 | /(1 | /(2 | /(3 | /(4 | /(5 | /(6 | /(7 | /(8 | /(9 |

} SELECT HOLE #

*Fig. 19*

TABLE III (REF FIG 22)

| DISK # | $X_1$ | $X_2$ | $X_3$ | $X_4$ | $X_5$ | $X_6$ | $X_7$ | $X_8$ | $X_9$ | $X_{10}$ | $X_{11}$ |
|---|---|---|---|---|---|---|---|---|---|---|---|
| DD-1 | $h_1$ | $h_2$ | $h_3$ | $h_4$ | $h_5$ | $h_6$ | $h_7$ | $h_8$ | $h_9$ | $h_{10}$ | $h_{11}$ |
| DD-2 | $h_{11}$ | $h_1$ | $h_2$ | $h_3$ | $h_4$ | $h_5$ | $h_6$ | $h_7$ | $h_8$ | $h_9$ | $h_{10}$ |
| DD-3 | $h_{10}$ | $h_{11}$ | $h_1$ | $h_2$ | $h_3$ | $h_4$ | $h_5$ | $h_6$ | $h_7$ | $h_8$ | $h_9$ |
| DD-4 | $h_9$ | $h_{10}$ | $h_{11}$ | $h_1$ | $h_2$ | $h_3$ | $h_4$ | $h_5$ | $h_6$ | $h_7$ | $h_8$ |
| DD-5 | $h_8$ | $h_9$ | $h_{10}$ | $h_{11}$ | $h_1$ | $h_2$ | $h_3$ | $h_4$ | $h_5$ | $h_6$ | $h_7$ |
| DD-6 | $h_7$ | $h_8$ | $h_9$ | $h_{10}$ | $h_{11}$ | $h_1$ | $h_2$ | $h_3$ | $h_4$ | $h_5$ | $h_6$ |
| DD-7 | $h_6$ | $h_7$ | $h_8$ | $h_9$ | $h_{10}$ | $h_{11}$ | $h_1$ | $h_2$ | $h_3$ | $h_4$ | $h_5$ |
| DD-8 | $h_5$ | $h_6$ | $h_7$ | $h_8$ | $h_9$ | $h_{10}$ | $h_{11}$ | $h_1$ | $h_2$ | $h_3$ | $h_4$ |
| DD-9 | $h_4$ | $h_5$ | $h_6$ | $h_7$ | $h_8$ | $h_9$ | $h_{10}$ | $h_{11}$ | $h_1$ | $h_2$ | $h_3$ |
| DD-10 | $h_3$ | $h_4$ | $h_5$ | $h_6$ | $h_7$ | $h_8$ | $h_9$ | $h_{10}$ | $h_{11}$ | $h_1$ | $h_2$ |

"DOWN-BORES" / "UP-BORES"

Fig. 23

PARTITIONABLE PORTABLE FLEXIBLE DISK PACK

CROSS REFERENCE TO RELATED APPLICATIONS

This application is a continuation-in-part of Ser. No. 711, 647 filed in the United States Patent and Trademark Office on Aug. 4, 1976 on behalf of the same inventors, commonly assigned, and herewith incorporated here by reference.

This and the following commonly assigned recently filed patent applications are related to the subject matter of this application and are herewith incorporated by reference.

Ser. No.: 711,579 Filed: Aug. 4, 1976
Ser. No.: 711,628 Filed: Aug. 4, 1976
Ser. No.: 720,905 Filed: Sept. 7, 1976
Ser. No.: 720,910 Filed: Sept. 7, 1976

BACKGROUND AND FEATURES OF THE INVENTION

This invention relates to data recording and in particular to novel improved multi-disk arrangements of data records adapted for automatic partitioning.

Workers in the art of generating and using recording media are aware of the various forms it takes; in the case of digital recording these forms have historically comprised drums, disks and tape in various configurations. Each medium has its own advantages and shortcomings depending upon the application. As mentioned in U.S. Ser. No. 711,647, magnetic disks have well known advantages, and in the form of "flexible disks" can serve as a "unit record" medium that is compact, light, and is readily transported, stored, and handled, interchangably with other like disks. Flexible (or "floppy") disks are now widely used in the data processing arts.

Workers recognize that costs may be reduced in many cases by replacing a rigid magnetic recording disk with a "floppy" disk. Floppy disks can be fashioned from well-known polyester sheet material (e.g., the familiar polyethylene terephthalate used for magnetic tape) with a magnetic coating thereon — this plastic being simply cut into the shape of a circular disk with a central mounting hole to accommodate the familiar drive-spindle. Such a "prior art" floppy disk is well known to workers and is shown in FIG. 1; a conventional envelope, or jacket, therefor is illustrated in FIG. 2.

The present invention is directed toward improving the design of such flexible magnetic disks as adapted for collection in a "floppy pack" such that automatic partition means may be employed to split the pack and expose any selected disk surface. That is, an improved "floppy disk pack" according to the invention is particularly adapted for such automatic partitioning — using surprisingly simple means and methods as described hereinafter. —prior efforts with flexible disks:

Workers are familiar with prior approaches to the design and manufacture of floppy disks and to related equipment for handling them. Several are described in U.S. Ser. No. 711,647.

Workers are aware that for many applications of floppy disk pack applications, it is of paramount importance to minimize disk cost while yet maintaining accurate, reliable operation. Thus, it is often desirable to fabricate all floppy disks in a pack by a single common pressing operation, with all disks identical — yet still render the disks uniquely "selectable" when collected into a pack. The invention teaches this, and other techniques, using utterly simple expedients. For example, with the invention an identical set of disks may be stacked with each disk in turn merely rotated by a prescribed angle relative to its predecessor and thereby produce a floppy pack affording the "plunger-partition" characteristics described in U.S. Ser. No. 711,647. Using a prescribed pattern of index holes such a pack will exhibit the desired "reference axes" from which "select angles" may be determined.

According to a further feature, such a "common perforation" mode of disk construction and pack arrangement may also be adapted for "dual-size recording" with the (common) partition and indexing hole pattern arranged to allow "flip-side" operation. Workers who appreciate the remarkable character of "floppy packs" in general will best appreciate these features and their surprising effectiveness despite the surprising simplicity of the techniques and the unexpected versatility of such "common perforation" disks. For instance, it was quite unexpected that with the disk design so-simplified it could nonetheless afford a wide latitude in selecting the number and position of "partition sites".

The present invention is directed toward providing improved multi-disk record units (disk packs) which are better adapted to meet the foregoing problems and objectives in a manner satisfying minimum-cost objectives. The invention maintains the convenience of packaging a number of floppy disks in a convenient unit record file ("pack") while prescribing improved simplified techniques for fabricating the disks and pack.

The foregoing and other features, objects and advantages according to the present invention will be more fully appreciated and become more apparent upon consideration of the following description of preferred embodiments, taken in conjunction with the attached drawings, wherein like reference indicia denote like elements.

BRIEF DESCRIPTION OF THE DRAWINGS

FIGS. 1 and 2 are schematic plan views of a prior art flexible disk and an associated prior art jacket, respectively;

FIG. 3 is a diagrammatic plan view of a flexible disk modified with a hole-encoding pattern according to the invention, while

FIG. 7 is a plan view of an improved protective jacket, especially adapted for disk packs like those in FIGS. 4 and 5, while

FIG. 9 is a front perspective view of a "disk drive" adapted for handling disk pack media like the embodiment of FIGS. 4 and 5, as housed in a protective jacket like that in FIGS. 7 and 8, while

FIG. 11 is a schematic side view of a pack partitioning arrangement adapted for use with disk packs like those in FIGS. 4 and 5 and particularly adapted for inclusion in a flexible disk drive like that of FIGS. 9 and 10; while

FIG. 15 is an exploded side perspective of a modified "single-hole-pattern" pack embodiment, similar to FIG. 4; while

It is instructive to first consider the design and construction of a relatively conventional floppy disk design 1' as indicated in the prior art FIG. 1. Thus, prior art disk 1' may be understood as a well known "industry-compatible" type of flexible disk particularly adapted for employment as a unit magnetic data record. Such a disk record will be recognized as comprising a circular flexible substrate of polyethylene terephthalate or the like having a magnetic coating on at least one side to thus define a magnetic recording surface. Such disks 1' are adapted for protective containment and operation within an envelope, or jacket 3', as indicated by prior art jacket 3' in FIG. 2 within which such a floppy disk may be stored, as well as rotated for magnetic data-transcription when inserted into appropriate apparatus.

Thus, disk 1' has a central aperture 1'-h for engaging a conventional rotary-drive spindle (while contained within jacket 3'), there being a prescribed recording track zone 1'-IT, 1'-OT; also, an "index hole" 1'-Ih is disposed (within 1'-IT) along a prescribed "reference radius" AS and adapted to establish a "Start Radius" for circumferential data tracks as known in the art. Within inner non-recording margin 1'-IT is an inner "contact annulus" defining the locus of engagement with spindle-contact means as known in the art.

DETAILED DESCRIPTION OF PREFERRED EMBODIMENTS

Figure 3A:
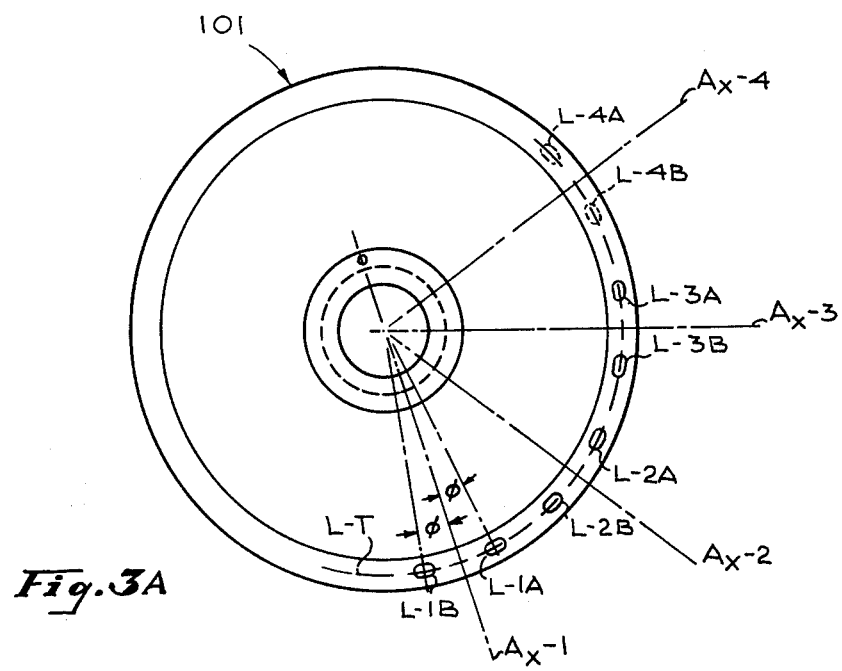
FIGS. 3A, 3B, 3C and 3D are like views of alternate arrays of holes (apertures)
Figure 3B:
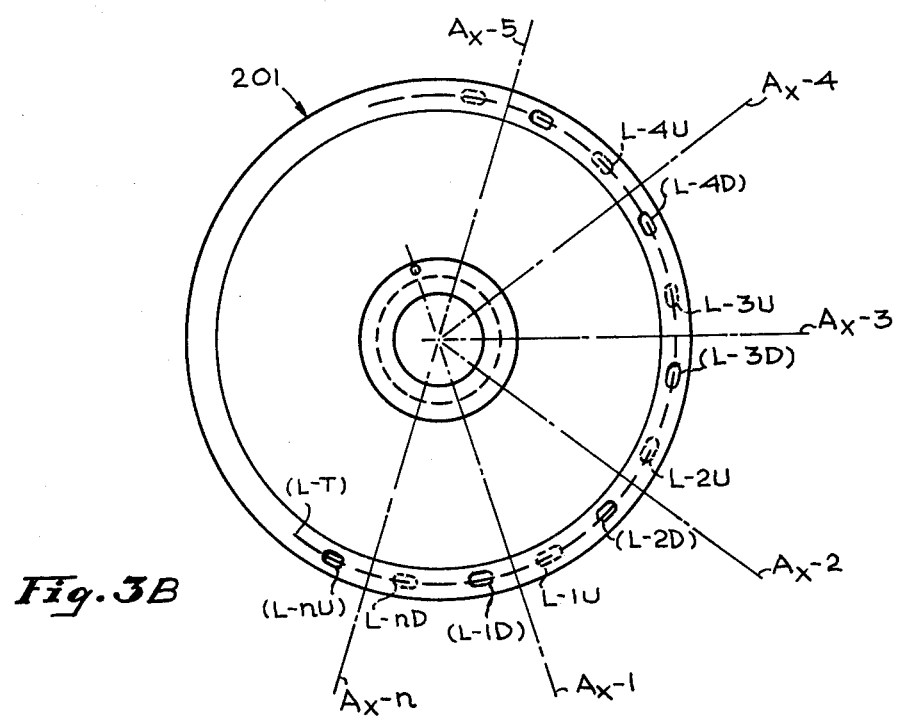
Figure 3C:
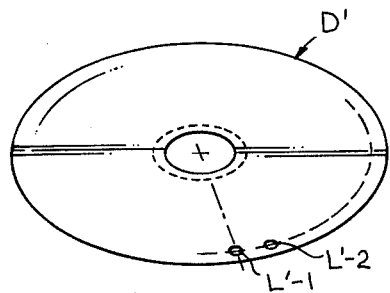
Figure 3D:
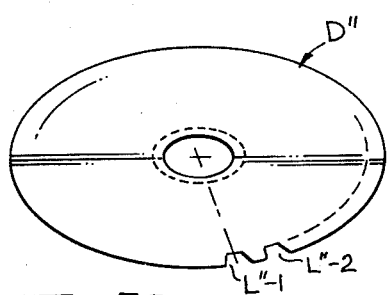
Figure 5A:
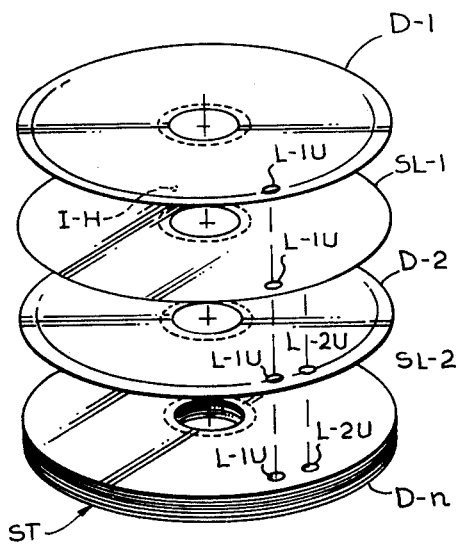
FIG. 5A shows a similar, schematic, view of a like disk pack embodiment, including separator disks as well, with several elements exploded-away for illustration purposes.
Figure 4:
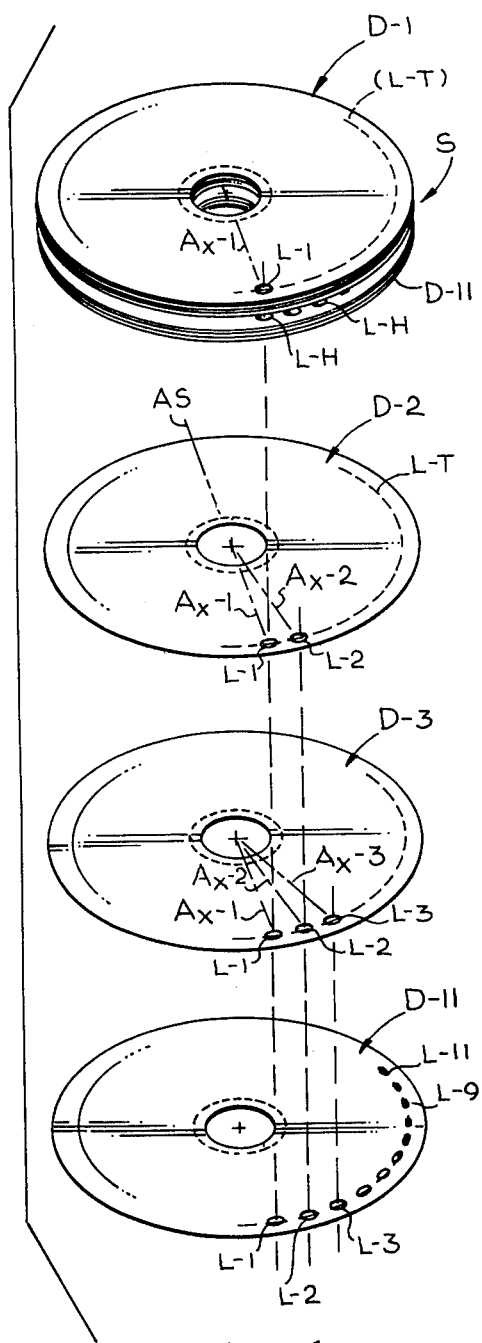
FIG. 4 is a schematic diagram of a flexible disk pack embodiment according to the invention, with exemplary disks therein shown exploded-away for illustrative purposes.
Figure 5:
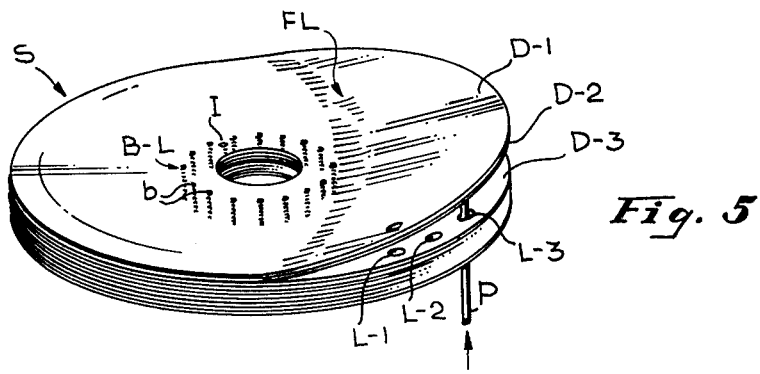
FIG. 5 is a schematic side perspective of the disk pack embodiment of FIG. 4 interacting with associated pack-partitioning means; while FIG. 6 indicates a side view of such an arrangement in operative relation combination with a turntable and an associated transducer carriage assembly.

FIGS. 3, 4 and 5 indicate one technique for fabricating disk packs according to a "variable" hole-pattern mode whereby a different pattern of partition-holes is cut in each disk of a pack. Thus, with the disks all stacked in registry (e.g., all registered on a single, commonly-located index hole) the resulting pack will exhibit the required array of "partition-bores", one for each disk selection and exposure operation — each bore (aligned holes) being disposed at a different respective angular position about the pack. Then, a given partition may be achieved by simply rotating the pack to register the corresponding "partition-bore" needed to give access to the "selected" disk by the partition means (e.g., plunger P). This and other related "variable" hole-pattern schemes are more fully described elsewhere and in the cited U.S. Ser. No. 711,647.

Figure 15:
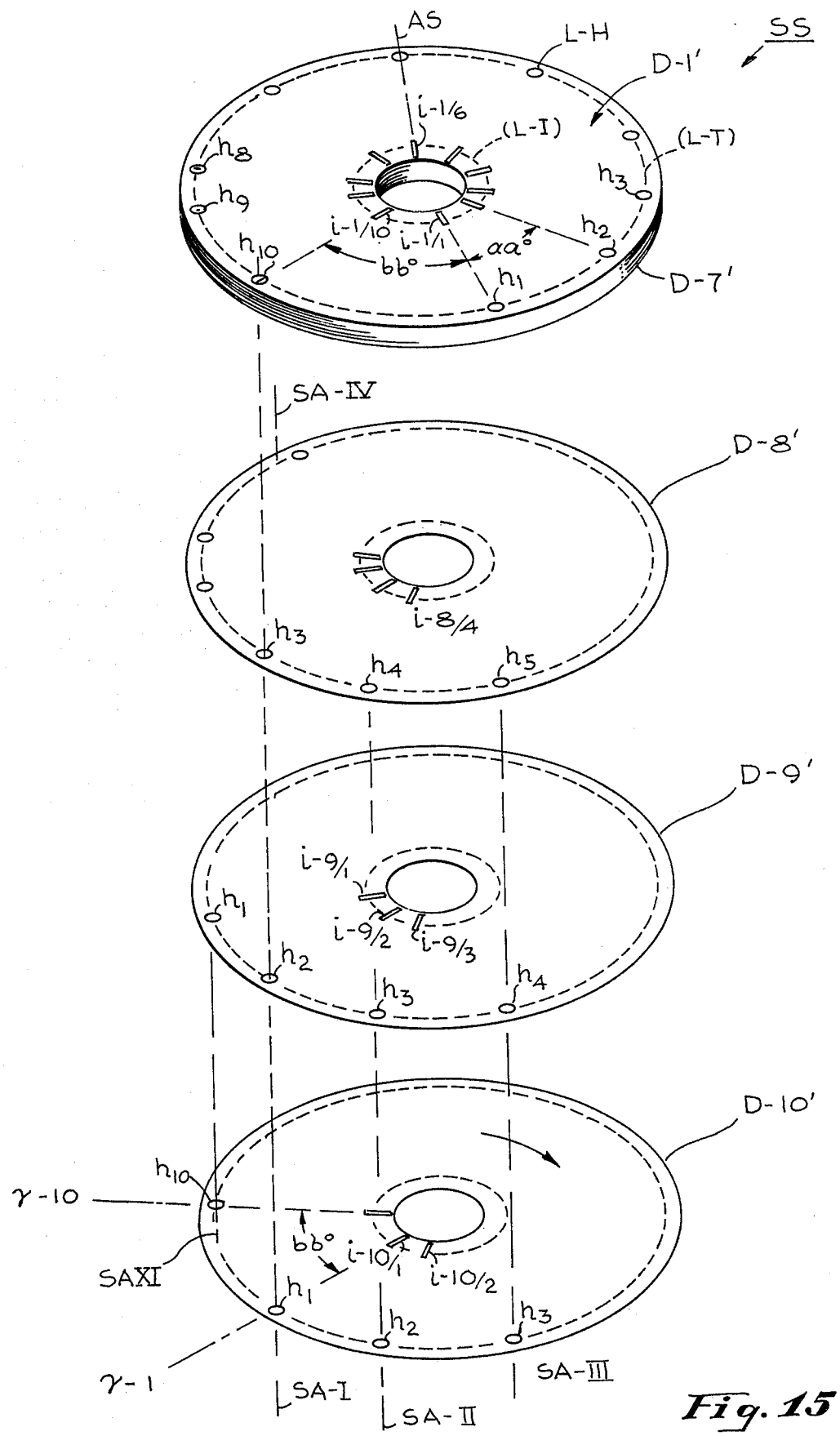
Figure 16:
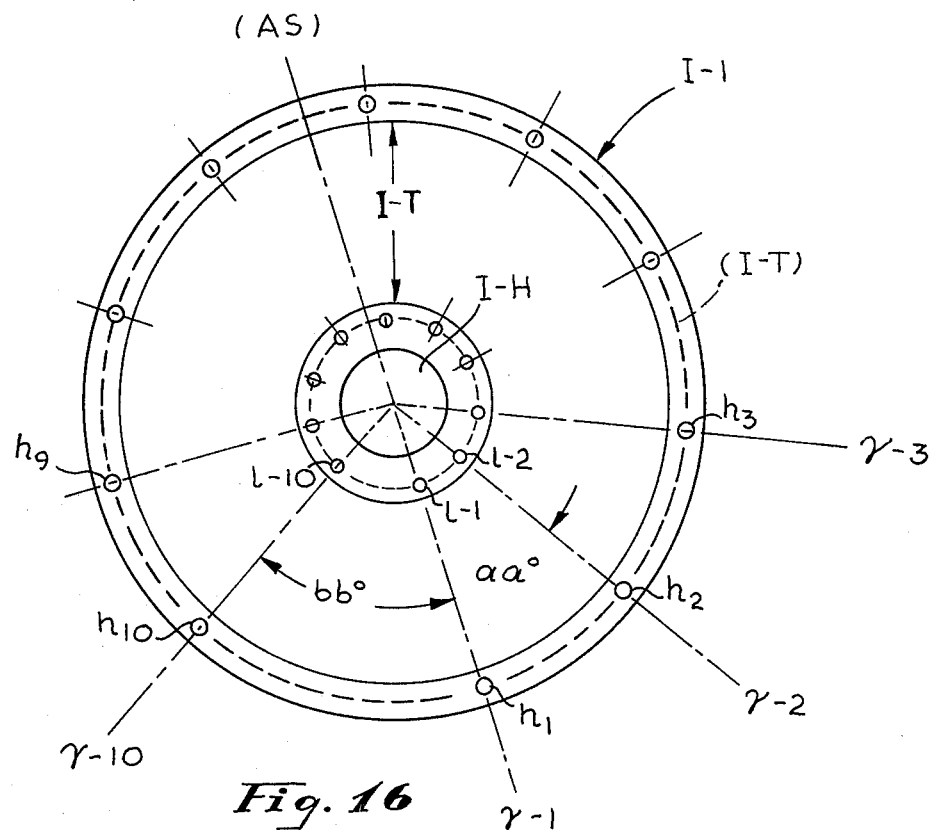
FIGS. 16 and 17 are plan view diagrams indicating a mode of stacking disks for embodiments like FIG. 15, and FIGS. 18 and 19 tabulate resulting partition bore patterns.
Figure 17:
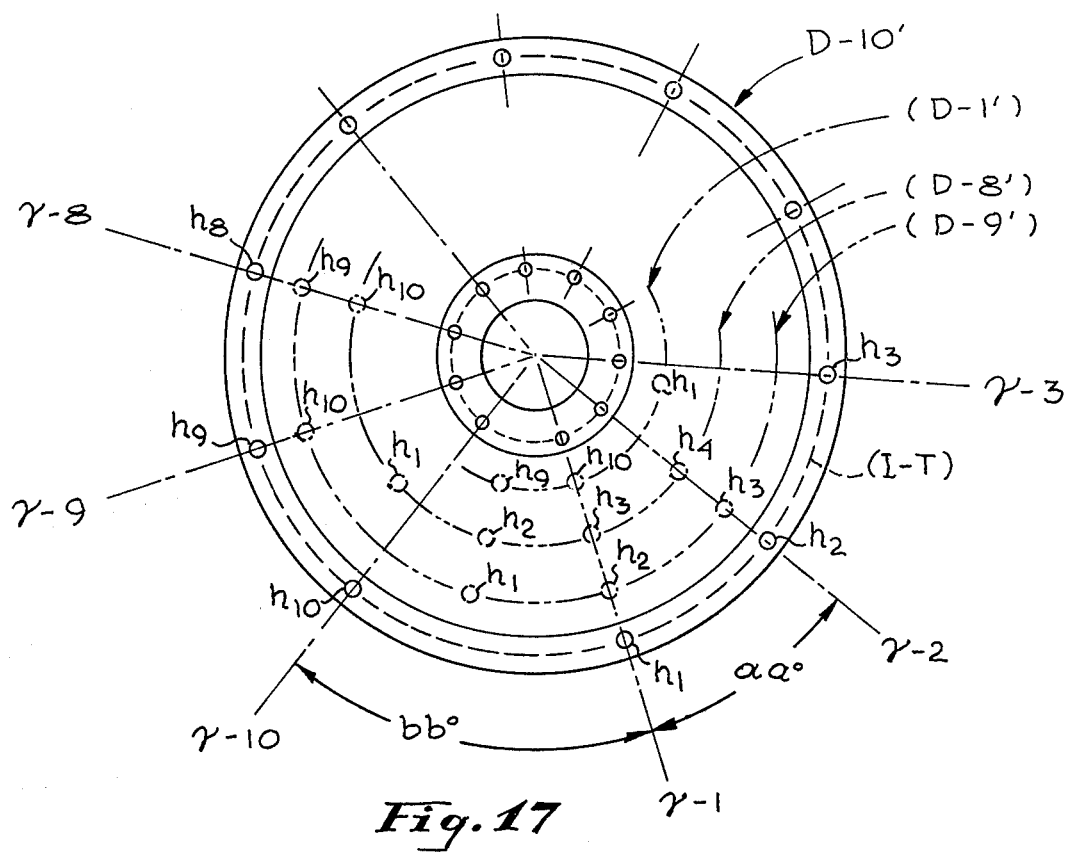

But, as workers will attest, it will often be preferable to use a single identical disk configuration and the mentioned "common-perforation" pattern, e.g., to avoid the need for cutting a different hole pattern in each disk. FIGS. 15-17 schematically indicate an embodiment of such a "common-perforation" pattern according to a prime feature of invention. According to this feature, a single identical pattern of partition holes is cut in all disks, together with an associated "multi-index hole" pattern. When the disks are stacked, each disk is rotated into partial misregistration with all other disks to thereby dispose its associated partition-holes at a unique characteristic rotational position in the pack. The effect is to render an array of "partition-bores" which is functionally the same as those alluded to above in the "variable" hole-pattern technique (and detailed in U.S. Ser. No. 711,647) — the holes being differently positioned, rather then differently cut, in each disk.

Disk I-1 in FIG. 16 illustrates this "common-perforation" pattern with ten (10) partition holes ($h_1$ through $h_{10}$) disposed equidistant (angle $aa°$) about disk I-1 along a circumferential track, except for an unequal separation between "terminal holes" — i.e., the separation between first hole $h_1$ and the last hole $h_{10}$; or "terminal separation" $bb°$, is, here, greater than that (common) distance between all other partition holes [and workers will perceive that "terminal separation" $bb°$ may conversely be less than $aa°$ in other applications]. Thus, the separation angle $bb°$ between (the radii of) "last hole" $h_{10}$ and "first hole" $h_1$ is greater than the angle $aa°$ between all other holes ($bb° > aa°$).

Disk I-1 is otherwise identical to the aforementioned disks (e.g., in FIG. 3) except as mentioned; for instance, including the same kind of inner and outer track-bands with intermediate recording band (I-T), hub-bore I-H and annular bond sites (b), etc. However, disk I-1, and all of its stacked companion disks, will also exhibit a common "multiple index pattern", with an index hole $i$ along each partition-hole axis so that despite the stacking of disks into this "partial misregistration", one index bore will nonetheless ultimately remain "open" through the pack (e.g., the bore along "reference plane" AS in FIG. 15 resulting from registering index slit $i\text{-}10/_1$ of disk D-10' with slit $i\text{-}9/_2$ of superposed disk D-9', then $i\text{-}8/_3$, etc. — through $i\text{-}1/_{10}$ of D-1', the top disk in the pack).

FIG. 15 illustrates (schematically) a ten-disk stack SS of identical disks (D-1' through D-10'), all exhibiting a common identical pattern of "partition holes" ($h_1\text{-}h_{10}$) and associated index slits (i). Each partition hole $h$ may be understood as disposed along a respective disk radius (e.g., radius $r\text{-}1$ for hole $h_1$ or radius $r\text{-}10$ for $h_{10}$ — see FIG. 15) at its intersection with partition track L-T. Similarly, one index slit $i$ is aligned along each such radius at a common "index track" L-I disposed inside the recording band I-T (e.g., slits $i\text{-}10/_1$ through $i\text{-}10/_{10}$ along radii $r\text{-}1$ through $r\text{-}10$ of disk D-10' and slits $i\text{-}1/_1$ through $i\text{-}1/_{10}$ on disk D-1'). Further, in FIG. 15 the radii r-1 through r-10 of bottom disk D-10′ may be understood as extended in space normal to D-10′ to form ten "partition planes", SA-I through SA-X, respectively.

Thus, workers will appreciate that these disks are, as a group and according to the invention, encoded and arranged to be manipulated as a group for the selectable partitioning, or splitting, of the stack adjacent any selected disk surface. This is basically accomplished in accordance with the invention by providing the stacked disks with an encoded arrangement of apertures such that at least one set of unique various-length partition paths or partition bores are provided from a respective end of the stack, each bore terminating at the surface of a different disk. Partition forces applied along a selected one of these bores will then cause the stack to be flexed open between a corresponding pair of adjacent disks in the stack, exposing the "selected" disk surface. In the preferred embodiments considered herein, this is controlled according to the rotational (angular) position assumed by the pack relative to an associated partition means as described hereinafter. —Locator-hole array ("common-perforation" disk design):

According to one feature of novelty, a file of these novel "commonly-perforated" flexible disks D-1′, etc. (FIG. 15) are manufactured to be identical and adapted to include a common prescribed array of partition apertures or locator holes, L-H, as schematically indicated, for example, by locator holes $h_1$, $h_2$, $h_3$, etc. This aperture array will be seen as establishing a certain mode whereby the stacked disks may be partitioned according to a unique, simple control involving merely rotating the stack to different (rotational) angular positions, each position corresponding to exposure of a respective (face of) one of the disks. Each disk in a file, or stack SS, will be understood as having a unique identifiable number of such locator holes L-H so that when the disks are stacked superposed in congruence with their circumferential edges in registry, they will be seen to represent a hole-encoded array. That is, when viewed from one side, the stack will present an array of partition-bores (holes L-H in registry), each bore at different angular location about the disk periphery and each bore terminating at a different respective disk. Thus, each partition-bore corresponds to a prescribed select-plunger site adapted to facilitate the splitting, (i.e., partial-partitioning), of the stack to expose the recording surface of a corresponding selected disk. —"rotary-shift" disk stacking:

Now, an illustrative technique for stacking such identical disks into a partitionable pack will be described with reference to the exemplary embodiment in FIG. 15 (pack SS). Thus, with bottom disk D-10′ used as a reference (though any disk will serve) disks D-9′ through D-1′ will, in order, be superposed in registration on its predecessor and will then be rotated by a prescribed common angle (e.g., angle aa°, clockwise) — thereby creating a pack with ten partition bores, each bore at a different partition site distributed about the pack somewhat regularly — each site being associated with the selection of a different respective disk in the pack. For example, D-9′ is superposed in registry on D-10′ and is then rotated by angle aa°, clockwise (aa° is the "normal" inter-hole separation here). This will register the partition holes $h_2$ through $h_{10}$ with holes $h_1$ through $h_9$, respectively of underlying disk D-10′, and will also "block" hole $h_1$ on D-9′ by positioning it at a "dead spot" sector between the "terminal radii" (r-1 and r-10) of D-10′. Next, disk D-8′ is superposed in registry with D-9′ and then likewise rotated (by aa° clockwise) — this serving to register the partition holes on D-10′, D-9′, D-8′, as indicated very schematically in FIG. 18 (Table I).

The foregoing will indicate how this technique for stacking "common perforation" disks can serve to "block off" successive "partition-bores" according to the described rotation for "partial misregistry"; i.e., whereby rotation of disk D-9′ blocks the bore along plane SA-X (at D-9′); rotation of D-8′ blocks SA-X plus SA-IX (at D-8′); rotation of D-7′ blocks SA-X, SA-IX plus SA-VIII (at D-7′) and so forth, culminating with D-1′ where, once so rotated, it blocks all planes except SA-I. FIG. 19 (Table II) indicates the full ten-disk stacking mode very schematically, denoting the successive bore-blocking disk rotation technique [here, with a slash ("/") line used to indicate blocking, with the adjacent partition hole of the blocking disk indicated by an adjacent numeral in parenthesis].

Similarly, FIG. 17 schematically indicates how D-9′ is stacked on D-10′ in such "partial misregistry", leaving each of its partition-holes registered with a respective adjacent-number hole of D-10′, except for hole $h_1$ which, falling between axes r-1/r-2, is "blocked" to thereby terminate the respective bore (note: only holes $h_1$, $h_2$, $h_3$, $h_9$, $h_{10}$ of D-9′ shown — and these are shown displaced radially-in from partition track I-T for clarity of explanation, it will be understood that in actual practice all partition holes h fall along track I-T). Likewise, when D-8′ is stacked on D-9′ in such "partial misregistry" all of its holes h will register with adjacent-numbered holes h of D-9′ except $h_1$ and $h_2$, as also indicated in FIG. 17. Top disk D-1′ will thus have all holes h misregistered except hole $h_{10}$ which will register with $h_1$ of D-10′.

The index slits (i) are similarly arranged and manipulated. That is (see FIG. 15), the superposition of D-9′ onto D-10′ registers slits $i$-9/$_1$, $i$-9/$_2$ etc. on D-9′, with slits $i$-10/$_1$, $i$-10/$_2$ etc., respectively on D-10′; also the indicated angular shift moves them so that the 10/$_{10}$ bore in D-10 is "blocked", and all other D-10′ slits are "open" (slits 10/$_1$, 10/$_2$ registering with slits 9/$_2$, 9/$_3$ respectively of D-9′ and so on). Superposition of D-8′ and a like rotation will then "block" slit bores 10/$_{10}$ and 10/$_9$ (on D-10′), leaving the other slit-bores "open" in the following registration pattern in Table IV, below:

TABLE IV

Slit Sites: * * * * * * * * * *
Disk No. 10′ :10/$_1$ 10/$_2$ 10/$_3$ 10/$_4$ 10/$_5$ 10/$_6$ 10/$_7$ 10/$_8$ 10/$_9$ 10/$_{10}$
9′ : 9/$_2$ 9/$_3$ 9/$_4$ 9/$_5$ 9/$_6$ 9/$_7$ 9/$_8$ 9/$_9$ 9/$_{10}$ X$_{(1}$
8′ : 8/$_3$ 8/$_4$ 8/$_5$ 8/$_6$ 8/$_7$ 8/$_8$ 8/$_9$ 8/$_{10}$ X$_{(1}$ X$_{(2}$ Superposition and like rotation of disk D-7′ will also block slit 10/$_8$ (of disk D-10′, along with slits 10/$_{10}$, 10/$_9$ thereof); likewise D-6′ is then stacked to also block slit 10/$_7$; then D-5′ blocks 10/$_6$, then D-4′ blocks 10/$_5$; then D-3′ blocks 10/$_4$; then D-2′ blocks 10/$_3$ and lastly disk D-1′ also blocks slit 10/$_2$ — leaving only one "index channel" open from slit 10/$_1$ of D-10, through the pack SS, to register with slit 1/10 of D-1′, as is desired.

Workers will appreciate that a "common-perforate pattern" disk design and a "rotary shift" stacking mode like the above described (FIGS. 15-19) results from distributing the partition holes so that all are equidistant (i.e., separated by angle aa°) except for the "terminal"

(first and last) holes which are differently spaced, by $bb°$ (here, $bb° > aa°$) — so that a constant "rotary shift" of each successive stacked disks will so partly-misregister the disk partition holes as to cumulatively "block" the partition bores, each at the level of a different disk. Workers will also perceive that according to this scheme, this "terminal" separation ($bb°$) of partition-holes may alternatively be less than the "regular separation" ($aa°$) thereof (i.e., $bb < aa$). An example of this is indicated very schematically in FIG. 20 described as follows.

Figure 20:
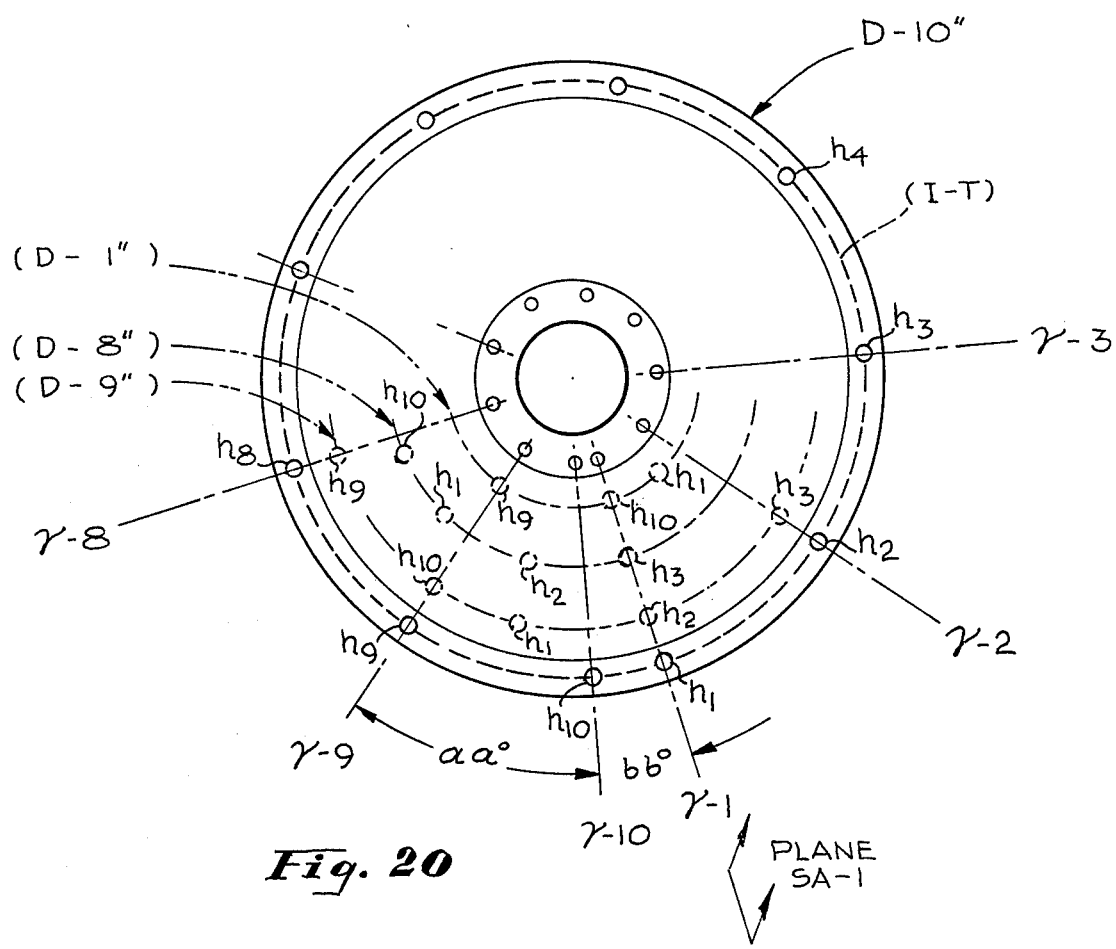
FIG. 20 is a plan view like FIGS. 16 and 17 but indicating disk stacking for a modified "single-hole-pattern"

—modified embodiment (FIG. 20):

In FIG. 20 the same kind of stacking technique is illustrated as in FIG. 17, except that the "terminal" partition holes (e.g., holes $h_{10}$, $h_1$ of D-10") are separated by a "terminal separation" ($bb°$) which smaller (rather than larger) than the "normal separation" ($aa°$) of the other partition holes (i.e., $bb < aa$) though stacking is the same, as are the results. Thus, disk D-9" is indicated very schematically as superposed on D-10" in registry, then rotated clockwise by $aa°$, throwing its $h_1$ hole beyond hole $h_{10}$ of D-10", but leaving each of its other partition holes $h$ registered with a respective adjacent-number hole of D-10". [As in FIG. 17, holes $h$ on disks D-9", D-8" and D-1" are illustrated as displaced radially inward from track I-T — but this is only for purposes of clear explanation; they will be understood as all falling along partition track I-T in actual practice]. Next, superposition and like rotation ($aa°$ CW) of D-8" leaves all of its holes $h$ registered except $h_1$ (as with D-9") plus $h_2$. Each successive disk stacked then adds one further blocked hole, in order, until finally with D-1" all holes are blocked except for hole $h_{10}$ (which is registered with $h_1$ of D-10 along plane SA-I).

Workers will perceive how disks may, according to the foregoing "common perforation" pattern of partition holes with an "anomalous" separation of terminal holes, and according to the associated technique of stacking in partial misregistration, serve to block successive "partition-bores" of the stack, in order. It will be apparent that this provides a pack exhibiting a different partition bore for partition at each disk at a different angular location and adapted to expose a prescribed surface of the respective disk.

Workers will further perceive how this technique may be implemented in other various ways. For instance, the illustrated packs (e.g., FIG. 15) are shown as preferably symmetrical as to hole location and may be "flipped" for partition from either side. Now, some workers may also desire a "double/opposed plunger" partition mode (e.g., as described in U.S. Ser. No. 711,647). In such a case, each partition site above-described should be replaced with a pair, each site-pair symmetrically flanking a common partition radius — with only one site in each pair being perforated, thus presenting a single partition hole aligned along each radious. Other modifications within the scope of this invention will occur to workers.

Workers will contemplate other similar implementations of this "common-select-hole pattern". For example, the "bottom" disk D-11 in FIG. 4 may be modified so that its "select-holes" L comprise eleven holes dispersed equidistant (at $aa°$ intervals) about track L-T, except that the "last" hole L-11 is made to fall spaced from hole L-1 by somewhat more than $aa°$ (but less than $2 \times aa°$) — e.g. hole centers separated by about 32.7° except about 33° between L-11 and L-1. Now, disk D-10 may consist of a duplicate of D-11, but oriented (when pack S is formed) so its locator holes L are rotated (e.g., clockwise) by the "normal" inter-hole spacing, here, 32.7°. Similarly, D-9 may consist of a duplicate of D-10 likewise rotated 32.7°. Likewise for D-8 through D-1 — all with identical partition hole patterns, but each rotated to take up a unique angular orientation in the pack. It will be recognized that this will operate to yield a successive blocking of bores; i.e., to "block" hole site L-1 on disk D-1; to block hole sites L-1 and L-2 on D-9 — and so on, with disk D-1 finally having all hole sites blocked (plunger paths terminated) except L-11 — thus facilitating the desired selective disk-deflection by entry of a plunger through a selected one of the "bores" (registered hole arrays) so formed.

Of course, steps must be taken to maintain a working index hole despite such angular shifts. For instance, and index hole may be provided along each select axis, whereupon only the "L-11" radius (axis $A_{X-11}$ aligned radially with L-11 hole only D-1) will present a "through-path" for index beam detection.

Other like modifications of the select hole pattern may be contemplated (e.g., rotating each disk more than $aa°$ with L-11/L-1 separation $bb°$ somewhat less than $aa°$ — such as $aa = 34°$; $bb = 20°$). Of course, selection of separation angle will be limited where only certain angular step increments of a rotating stepper-motor are feasible and where only certain plunger-transducer positioning and spacing is practical.

It is thus necessary to make this "terminal separation" ($bb°$) a different angle from the other separations (i.e., $bb = k(aa)$). Also, for convenience, etc it is preferred to keep $bb°$ less than $2 \times aa°$.

—multiple "partition-plungers"; "paired" locator holes:

Further, according to a modified feature of the invention, indicated functionally in FIG. 3A and described in U.S. Ser. No. 711,647, a plurality of such "partition-plunger means" (rather than a single plunger) may be used, together with associated plural sets of accommodating locator-holes. Workers should recognize that the described "hole-encoded" stack of flexible disks can be employed advantageously with such "multi-plunger" partition means. For instance, the plunger shown in FIGS. 6 and 11 may, instead, comprise an "opposed pair" adapted to urge disks in two opposed directions, rather than just one. One such plunger can deflect disks away from a "selected" disk surface, while the other plunger deflects disks away from the other disk side — (e.g., where two-sided transducer operation is contemplated). Such a plunger pair can also "hold" the "selected" disk in position stabilized for head-engagement (e.g., against a reference surface; or alternatively against the urging of a second opposed pair of plungers). This second opposed plunger advantageously strips the "selected" disk away from the deflected disks which may otherwise "carry" it along (e.g., held by static electricity or the like).

In any event, where a pair of such plungers is contemplated, they will typically be separated (by a distance p-d between excursion axes) and the "floppy stack" will accordingly be provided with two (not one) sets of partition-bores — one from either end of the stack! Preferably, and according to an improvement feature, each such hole lies at one of two perforation-sites flanking a common intermediate radius equidistantly.

Figure 22:
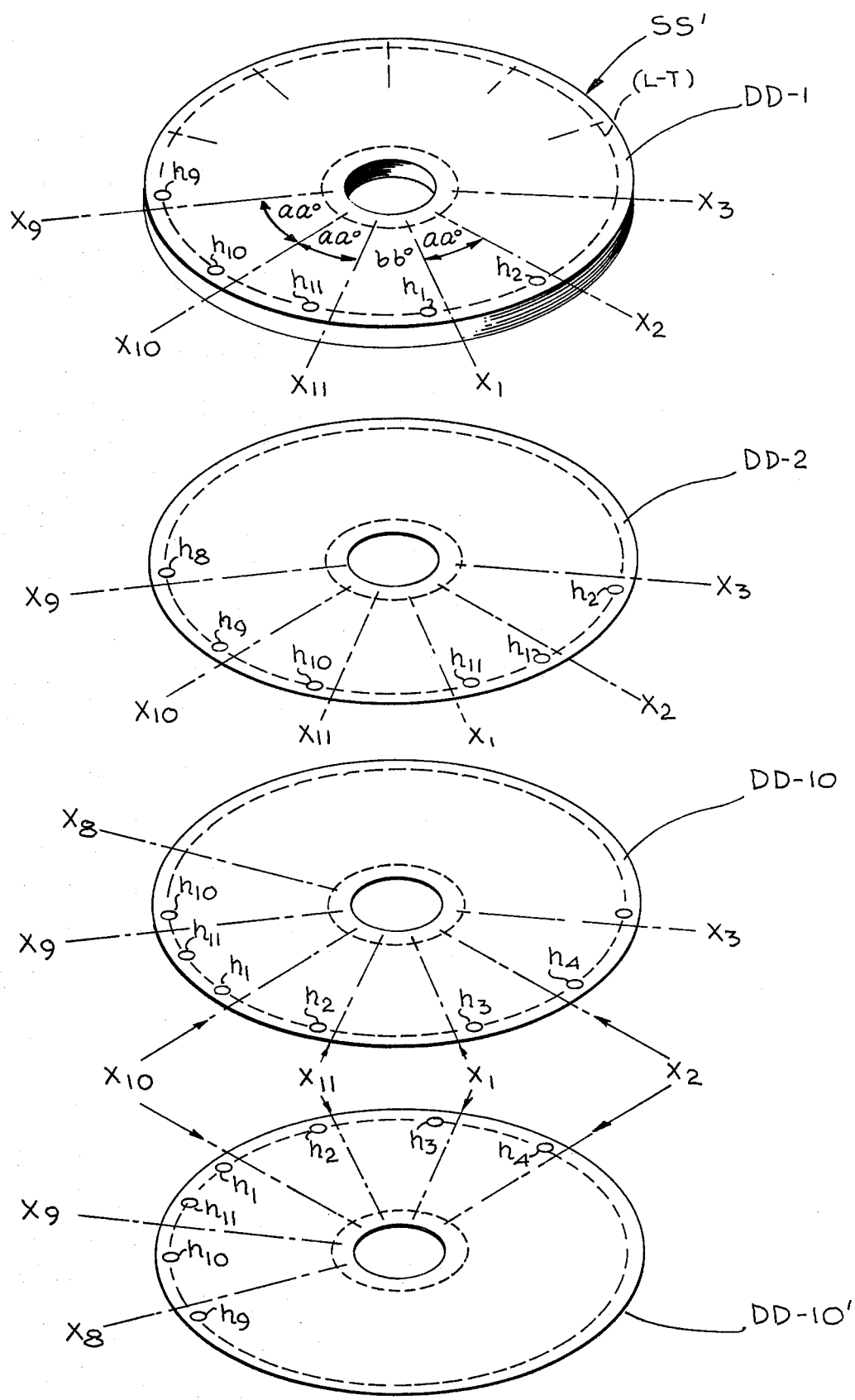
FIG. 22 is a perspective along the lines of FIG. 15 with the hole pattern and stacking mode modified, and FIG. 23 tabulating the resulting bore pattern. —conventional features.

Such an arrangement is illustrated by stack SS' in FIG. 22, comprising ten (10) identical floppy disks stacked in prescribed "partial misregistration" and like the aforedescribed disk stacks except as otherwise specified "bottom" disk DD-10 is depicted in "top-view" as well as "from below" (i.e., "flipped" at DD-10') to illustrate a feature whereby the described "partial-misregistration" series the dual function of successively closing-off bores in the first set and opening-up bores in the second set. More particularly, consider stack SS' as viewed from above and as stacked (proceeding from disk DD-1 down to DD-10) by rotating successive disks by $aa°$ (CCW). It will be evident that each disk has an aperture spaced $aa°$ from its neighbor (from $h_1$ to $h_{11}$) except for the smaller spacing $bb°$ between $h_{11}$ and $h_1$. Also, each aperture is spaced by the same amount (common angle) from an associated radial-axis (e.g., $x_1$ near $h_1$, $x_2$ near $h_2$ etc.). Further, each aperture should be viewed as having a companion bore-site symmetrically flanking its respective axis (i.e., the same distance therefrom on the other side, along track L-T) such that one site is the "mirror image" of the other, coinciding with the other when the disk is "flipped" (e.g., as DD-10' represents DD-10 flipped "upside-down").

The foregoing will make it apparent how the invention may be employed with a "double-plunger" array. That is, as stack SS' evolves with disks stacked from DD-1 to DD-10 — and each disk rotated by $aa°$ (CCW), "down bores", giving downward-access, will be gradually closed-off (e.g., all open on DD-1; one closed when DD-2 is sub-posed under DD-1; finally all but one blocked when DD-10 is sub-posed); whereas the counterpart "up bores" will be gradually opened-up as the stack builds (e.g., one created, adjacent $x_1$, when DD-2 is positioned below DD-1, till finally ten are created by the placement of DD-10). Of course, these "up-bores" flank the mentioned radial axes ($x_1$, etc.) symmetrically with the "down-bores" — and simply exchange places if the stack is "flipped-over" — an extremely useful feature as workers will attest! Workers will visualize a multitude of various ways this "double-plunger/double bore set" technique can be implemented.

Figure 6:
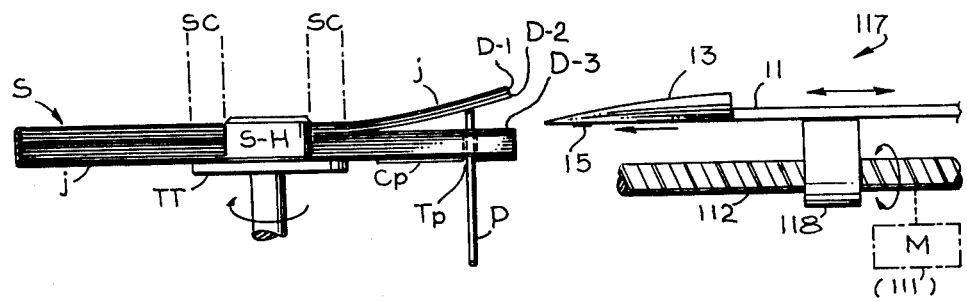
Figure 13:
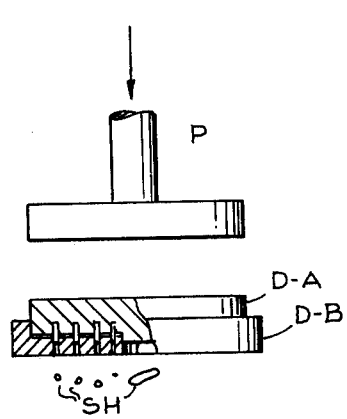
Figure 14:
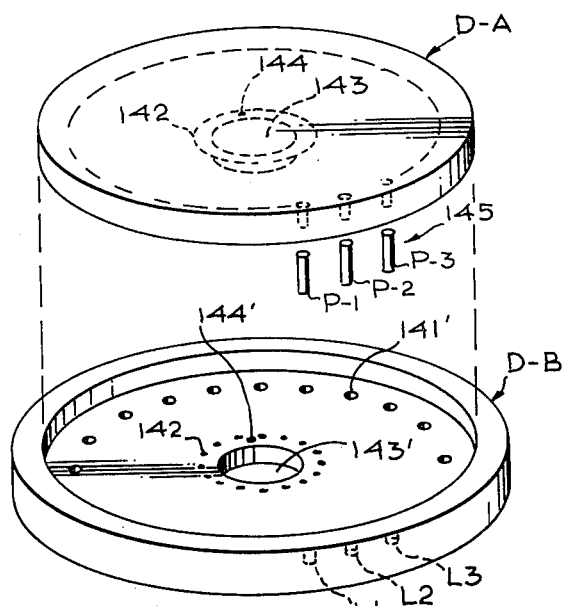
FIG. 14 is a schematic perspective view of a pair of mating disk-forming dies adapted to form hole-encoded disks of the type indicated in FIG. 3, these dies being shown in schematic operative relation in the side view of FIG. 13.

—novel disk pack:

According to a principal feature of the invention, improved flexible disks like those described above are apt for collation and stacking together in combination and properly registered in a novel "flexible disk pack", as indicated, for instance, in FIGS. 4 through 6 of FIG. 15. It will be evident, of course, that the pattern of locator holes (whether single or double pattern) and/or the mode of shifting a single pattern will be coordinated in the usual case with a particular stack in mind, the stack being comprised of certain number of such disks, with each disk in the stack having its own unique variation in the (common) pattern of locator holes — as to number and/or registration (e.g., each with a unique number of holes and/or registry pattern). Thus, as more fully described below, one may manufacture these disks in sets for efficiency and convenience sake. For instance, one may punch-out a set of common disk patterns as in FIGS. 15–18 and assemble disk packs by collating a prescribed total number thereof into a pack, stacking each disk in the described "partial misregistry". As a feature of convenience the disk total may be left somewhat "open-ended" and variable, so that disks may be added at any time after a pack is first assembled.

Manufacturers will find it particularly convenient to manufacture flexible disks according to the invention by relatively convenient inexpensive means, such as in a cutting-out or stamping operation, as well known in the art (see also U.S. Ser. No. 711,647).

Preferably, and according to another feature, when such a disk pack is assembled, the disks are bonded to one another along a bonding annulus disposed along a common registering circumference, adjacent the disk center, and spaced radially therefrom to lie in the inner "non-recording" band. Thus, a circular array of "epoxy pillars" B-L is indicated as a discontinuous serial of bonding sites in FIGS. 3 and 5, to constitute the pack bonding means, whereby each pillar B (FIG. 5) is comprised of epoxy. Alternatively, a continuous inter-disk bond may be provided by means well known in the art. This bond will hold the disks together as assembled in the stack and keep them from lifting away from one another and from being rotated into misregistration with one another.

Workers will contemplate alternate bonding techniques. For instance, one might interpose an annular adhesive spacer between disks in a pack and provide it with adhesive surfaces adapted to adhere to the upper and lower disk thereby bonding them together. In another technique, where contemplated disk format and handling allow, one might insert pins through each set of bonding bores and cap their ends, thus preventing misalignment in the radial and circumferential sense (also, perhaps, allowing prescribed axial freedom to better accommodate pack partitioning).

Workers in the art will recognize that such a permanently bonded flexible disk pack is new in the art and is uniquely well adapted for many desirable functions, such as the hole-encoded disk selection operations (described elsewhere), as well as for containment and operation of the pack — as a whole — within a protective jacket (as described below). Thus, workers may now contemplate the use of a multi-disk flexible pack as a multi-surface unit record which is almost as lightweight, as compact and as easy to manipulate, store, transport, etc. as a single disk, while having many times its storage capacity.

By way of illustration, it has been found that a pack of 20 flexible disks according to the invention (e.g., as in FIG. 3 and Table I), each with a nominal 3 mil thickness, can be used in a "floppy disk pack" presenting a composite thickness of little more than 60 mils and, rather surprisingly, may be readily packaged and operated in a protective jacket similar to the prior art jacket indicated in FIG. 2. Further, such a pack may be manipulated and operated inside this jacket with disk drive equipment that requires relatively little modification over the conventional single-disk drives known in the art.

--Liners:

FIG. 5A indicates a similar pack of flexible disks, D-1 through D-n, understood as bonded together in fixed, registering superposition to form a single unitary multi-disk pack ST. This pack is, however, somewhat modified, according to a further improvement feature, to include protective flexible spacers, or "liners" (SL) interleaved between adjacent disks in the pack. More particularly, FIG. 5A shows the upper two flexible disks, D-1 and D-2, exploded-away from stack ST for illustrative purposes, and indicates the protective liner means in the form of flexible plastic disks, SL-1 and SL-2, interposed between D-1/D-2 and between D-2/D-3, respectively. Also outer liners (top and bottom of pack —(not shown here) may be added as well.

Liners SL may be comprised of the same (or a closely similar) flexible plastic material as the disk substrates, but of course, will preferably carry no magnetic coating. It has been found that confronting oxide-coated sheets in certain embodiments may be rubbed or scraped against one another such as to "scour" or gall magnetic oxide from one to the other. For instance, this may occur with a novel flexible disk pack during partitioning, etc., and can be damaging. Alternatively, the liners may comprise a grit-absorbing material. This will prevent grit particles from indenting, scratching or otherwise affecting flexible disks in a pack.

According to this feature, liners S may be provided to protect every oxide surface, preferably being bonded together along with the disks into a unitary pack. Liners SL include an index hole I-h in registry with that of the disks D, as well as a locator hole pattern identical with that of the adjacent disk and in registery therewith. As to the "up-holes" (e.g., L-1U illustrated in SL-1 — i.e., adapted for the "up" select/partitioning arrangement represented by the disk embodiment in FIG. 3), it will be understood that a liner's locator hole pattern will be identical to that of an adjacent disk (here, disk D-2 for liner SL-2, D-1 for SL-1). For embodiments also including "down-holes" (as in the embodiment of FIG. 3B) the downhole pattern of a liner will follow that of its interposed disk (so a liner will never intervene between a transducer and exposed disk). Thus, the spacers, or liners SL, may for instance, comprise a clear polyester, such as polyethlene terephthalate (e.g., a white "Melanex", trade name of ICI) about 1-2 mils thick, or a similar thin flexible material with low friction, "non-galling", anti-wear surface (or surface coating). Liners will be especially useful where contemplated pack life/usage is to be extended and the associated pack enlargement can be tolerated. Also, such a liner may be interposed between the pack (top and bottom) and its envelope.

Alternate liner materials may of course be used as contemplated by workers in the art, the thickness and other characteristics thereof being modified to suit the requirements of a particular application. While not necessary in every application the use of such liners is preferred in cases where one or both magnetic recording surfaces of a flexible disk, so bonded into a flexible disk pack, exhibit wear and abrasion problems.

Of course, alternative to using liners SL, the stacked disks D may have one side thereof coated with a protective film, shielding it from such adverse contact with a facing magnetic recording surface (e.g., a coating of one to several mils of clear plastic such as "Black Watch" by 3M Co.) or the plastic substrate may be left uncoated by any magnetic oxide or by any similar coating. Of course, as workers in the art know, flexible disk manufacturers prefer to coat both disk sides with a magnetic oxide for their own manufacturing convenience, and to prevent curl.

Thus, it should be apparent to workers skilled in the art that according to this feature, with this or any similar stamping operation, stacks of hole-encoded disks of the type described may be very inexpensively and conveniently produced.

Figure 7:
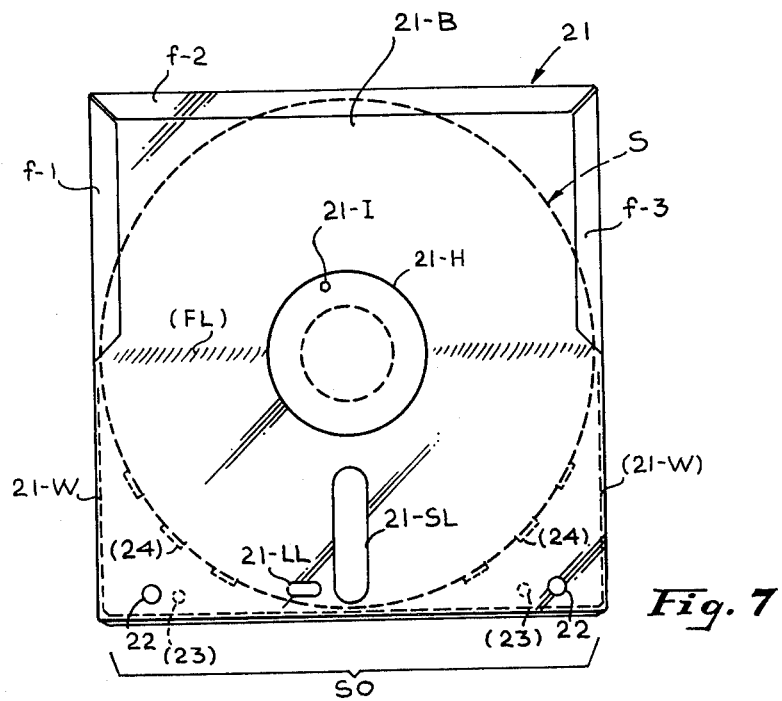
Figure 8:
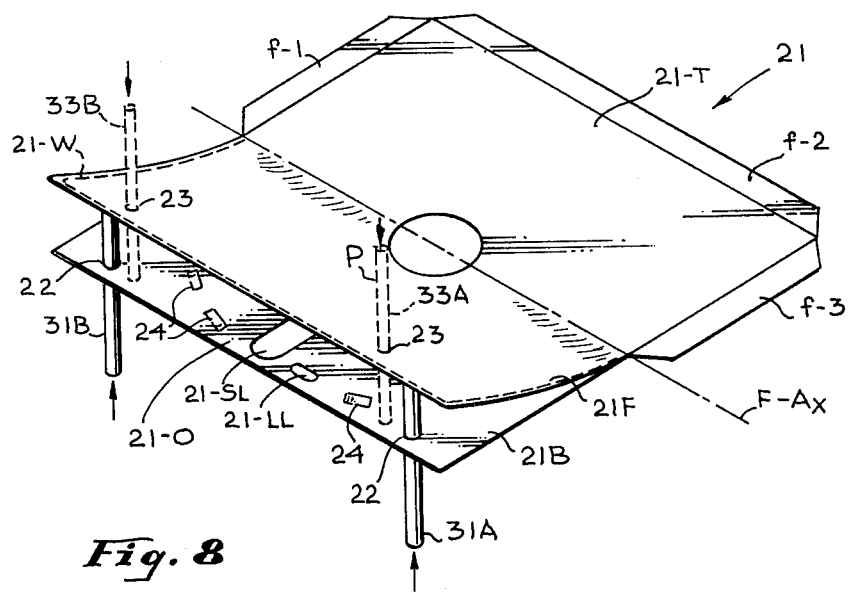
FIG. 8 shows this jacket in inverted perspective view and disposed in illustrative operative relation with schematically indicated opening means and partitioning means.

--Associated jacket embodiment:

Novel disk pack embodiments like those above described will be understood by workers to be particularly apt for advantageous use in the form of a cartridge, i.e., the combination of a disk pack in conjunction with a protective jacket or envelope structure in which the disk pack remains during partitioning and transducing operations. Such a jacket 21 is indicated, for instance, in FIGS. 7 and 8, being designed somewhat along the lines of a prior art, single-disk jacket 3' (FIG. 2), but modified for the purposes of the present invention as illustrated in FIGS. 7 and 8. Jacket 21 is shown in plan "bottom" view in FIG. 7; and is shown, in "top" perspective view, in FIG. 8 as cooperated with jacket-opening means, schematically shown in conjunction therewith and functioning as described below. Such a modified jacket will be perceived as especially suited for housing a rotatable pack of flexible disks, like pack S in FIG. 5, being apt for accommodating the rotation thereof, in situ, as well as for the locator hole partitioning mode and associated transducer access described above (see details in U.S. Ser. No. 711,647).

Thus, referring to FIGS. 7 and 8, jacket 21 comprises a pair of opposed, relatively flexible panels, namely top panel 21-T and bottom panel 21-B, joined together, along a closed end as well as along about one-half of the two adjacent sides by means of flaps f-1, f-2 and f-3 shown extending in partly assembled fashion from top 21-T in FIG. 8, and shown folded-over and joined to the edges of top panel 21-T in FIG. 7. Panels 21-T, 21-B may be comprised of PVC (polyvinyl chloride of about 10 mils nominal thickness), or like material, known to workers in the art.

Figure 9:
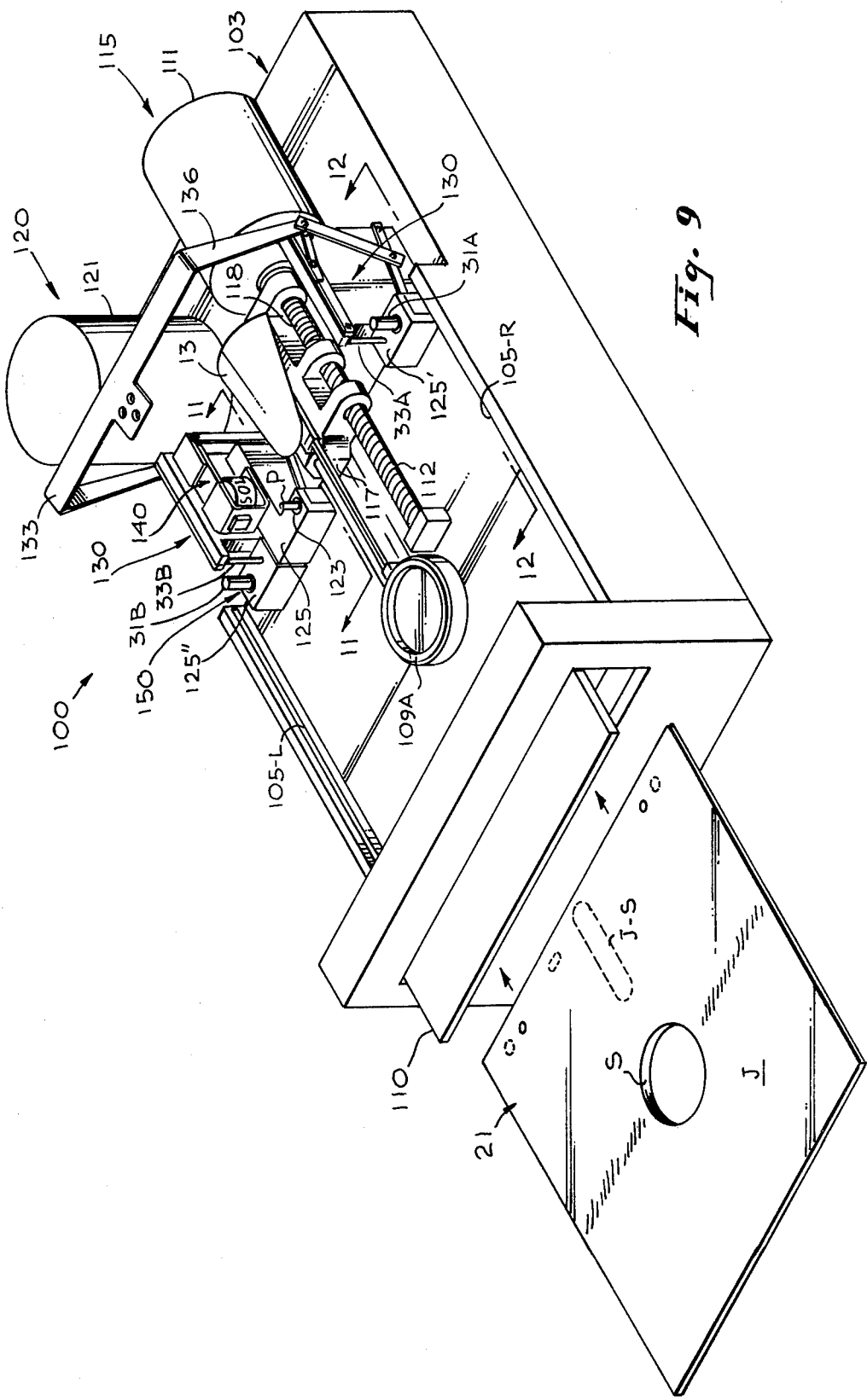

It will thus be understood that these top and bottom jacket panels 21-T and 21-B are preferably joined by folding over flaps f-1, f-2 and f-3 so as to permit their being spaced apart sufficiently to form an entry slot 21-O and to form a pocket for admitting and operating a flexible disk pack of prescribed diameter and thickness, such as shown in FIG. 5. Jacket 21 will have conventional apertures corresponding to the spindle hub and index hole (21-H, 21-I, respectively, but slightly enlarged therefrom), as well as having two pairs of "spreading-rod apertures" (up-spreader-apertures 22 through base panel 21-B, and "down-spreader apertures" 23 through top panel 21-T), to accommodate the upper and lower jacket spreading means, according to the invention (see in phantom FIG. 8). Illustrative pack S is shown outlined in phantom in FIG. 7. Spreading is preferably done automatically when the so-formed cartridge (jacket 21 containing disk pack S) is inserted into a disk drive (FIGS. 9 and 10), this being indicated schematically by the up-thrusting plungers 31 and the down-thrusting plungers 33 in FIG. 8, according to another feature. Down-plungers 33 are preferably also arranged to pin the jacekt to a fixed portion of the chassis to hold it fixed with respect thereto when the pack is rotated therein. Preferably the "spreading action" of these plungers is automatically invoked by closing the entry door of the drive apparatus after admission of the pack-containing jacket (FIG. 9). It will thus be apparent that the two opposed (upper and lower) "spreader means" 31 and 33 act in concert to separate the outer edges of the "entry slot" 21-O when the disk pack is to be "accessed" by a transducer assembly (FIG. 6).

Retainer means such as tabs 24 are also preferably provided within jacket 21 to retain the disk pack, removably, in prescribed position therewithin. These retainer tabs 24 preferably comprise a suitable number of upper and lower inwardly-projecting members projecting normally inward from the top and/or bottom panels adjacent entry-slot S-O and "following" the periphery of the pack as positioned within jacket 21. This is indicated schematically in FIGS. 7 and 8.

An "entry flap" 21-F is formed of the "outer half" of top panel 21-T, as schematically indicated in FIG. 8. Flap 21-F is adapted to be pivoted away from lower panel 21-B, along a prescribed flexing axis F-A$_X$ so as to provide an entry slot 21-O sufficient to accommodate the partitioning of the pack within the jacket as well as the related entry of the transducer assembly, as illustrated in FIG. 6. Preferably, this pivoting flap 21-F is held closed, to retain and protect the contained disk pack by suitable "spring return" means, either in the form of panel material which is suitably stiff and/or with a stiffening "return-wire" 21-W embedded along the periphery of the flap as indicated schematically in FIGS. 7 and 8. In extreme cases, return springs may be provided across slot 21-O.

Jacket 21 also has a slot 21-SL in base panel 21-B to accommodate engagement of the enclosed flexible disk pack (specifically the "bottom" disk thereof) with a transducer "contact pad" (CP) (see FIG. 6) when a Read/Write head is impressed upon (one or several disks in) the pack, opposingly, as known in the art. Similarly, bottom panel 21-B is also provided with an elliptical locator aperture 21-LL adapted for admitting a select-partitioning plunger of the type described above and illustrated in FIG. 5 and elsewhere.

Workers will appreciate that envelopes according to this feature will, at times, preferably be "flippable", i.e., allow one to operate the contained-pack from either side as above-mentioned. In such a case, as a further feature, it is preferred to modify the described jacket so that the up/down jacket-opening plungers may be interchanged upon "flipping". That is, as shown schematically in FIG. 21, the array of plungers 31 and associated envelope-ports is modified from "up/down-down/up" (looking across slit 21-O in FIGS. 8 and 21) to "up/down-up/down" — in effect switching the positions of plungers 33A and 31A and their associated envelope-ports 23/22 respectively. Likewise, an additional index port 21-I' is added.

Figure 21:
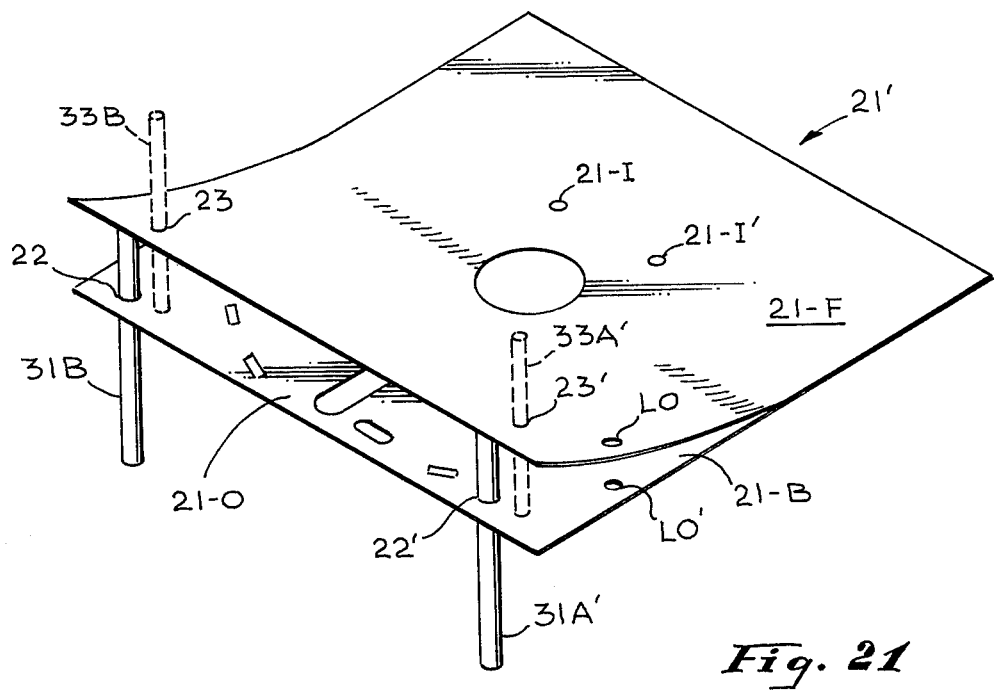
FIG. 21 is an upper perspective of a jacket in the fashion of FIG. 8, but modified somewhat.

Also, according to a related feature, the jacket is provided with a "flag" aperture such as registering holes LO, LO' through the panels of jacket 21' in FIG. 21. Such holes may be used to signal the presence of a "multi-disk" cartridge (as opposed to the conventional "single-disk" cartridge) and, being suitably sensed, invoke responsive action in the disk drive unit. Workers will readily appreciate the advantage of this "flag" feature (e.g., allowing one to use a common drive for single-disk and multi-disk cartridges, making automatic accommodations therefor) and how it may be implemented in various ways. For instance, a photo-detect assembly may be used to sense this "flag" hole only in single-disk cartridges, and responsively disable the jacket-opening and partition plunger assemblies.

Jacket 21 and the flexible disk pack contained therein thus comprise a novel flexible disk cartridge, with the pack so positioned and held therewithin as to be free to rotate, as well as to be selectively partitioned and accessed therein as previously described. Jacket 21 is preferably lined with a non-shedding, non-abrasive cleansing tissue on its inner faces as known in the art, to wipe clean and protect the outer surfaces of the disk pack contacted thereby.

Figure 10:
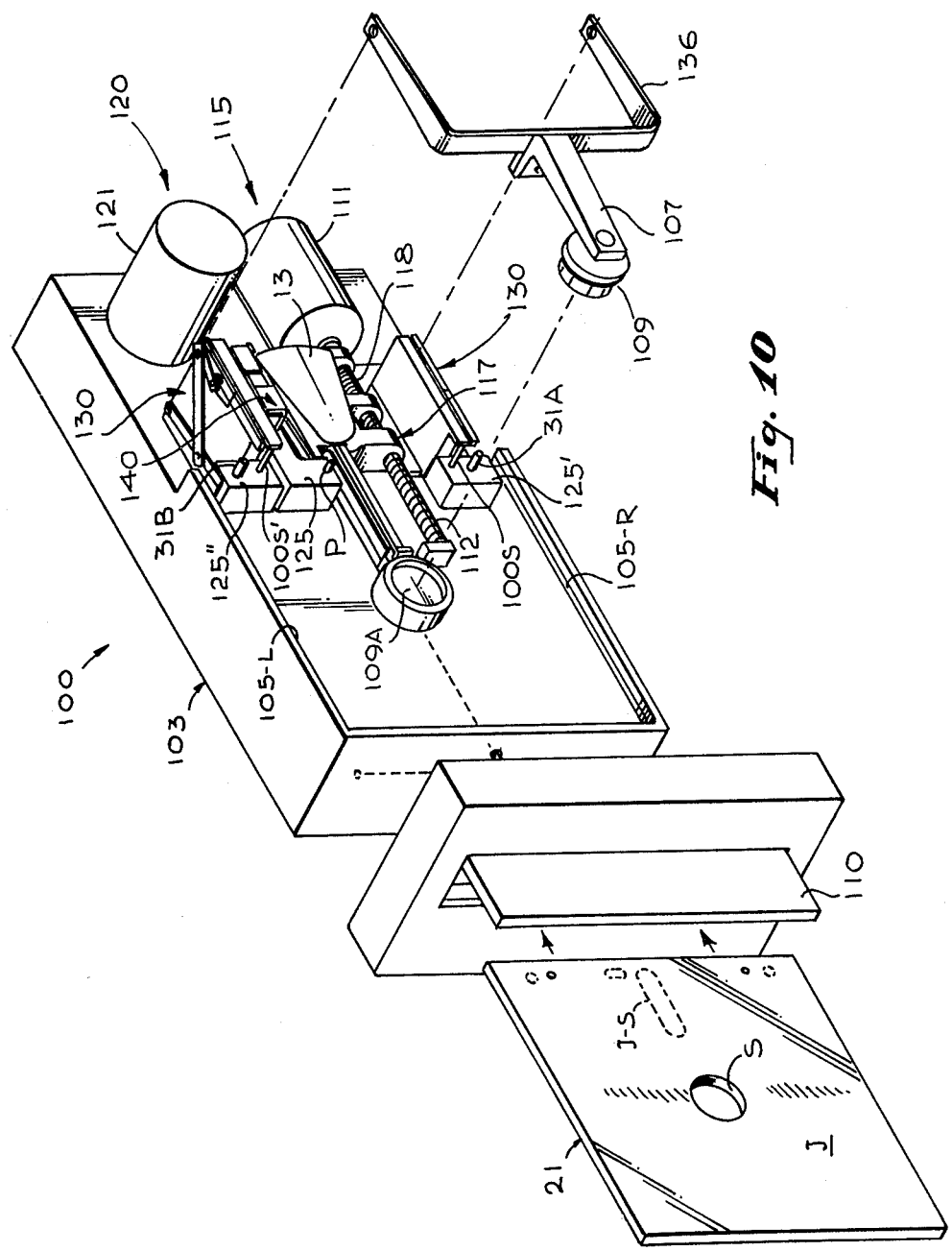
FIG. 10 is an enlarged close-up view of working elements of this drive, with certain superstructure broken-away for clarity of illustration.

--Modified drive for flexible disk pack:

FIGS. 9 and 10 show a relatively conventional type of flexible disk drive 100 which has been modified to accommodate operation with novel cartridges (jacketed flexible disk packs) according to the invention. That is, drive unit 100 will be understood by workers in the art to comprise a compact, portable, disk drive device that interfaces with a central processor portion of a data processing system by way of a suitable control unit (not shown), as known in the art.

Figure 11:
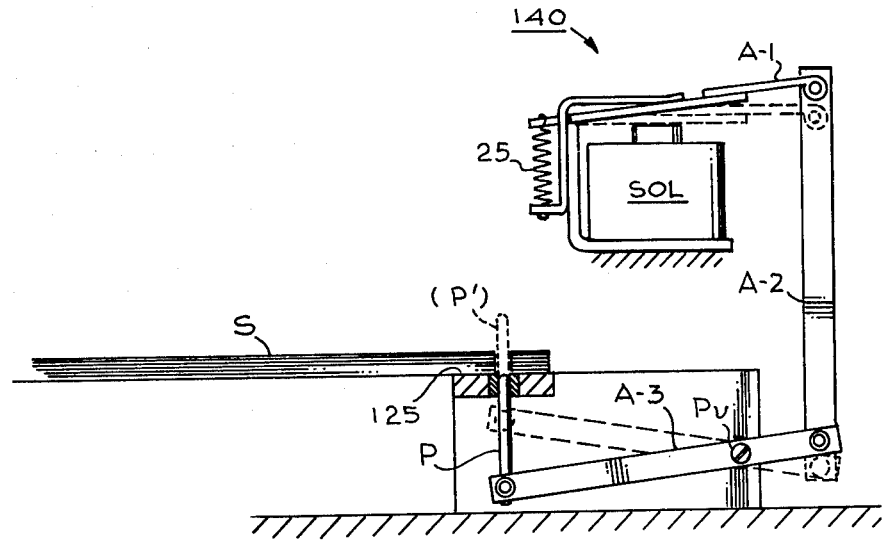
Figure 12:
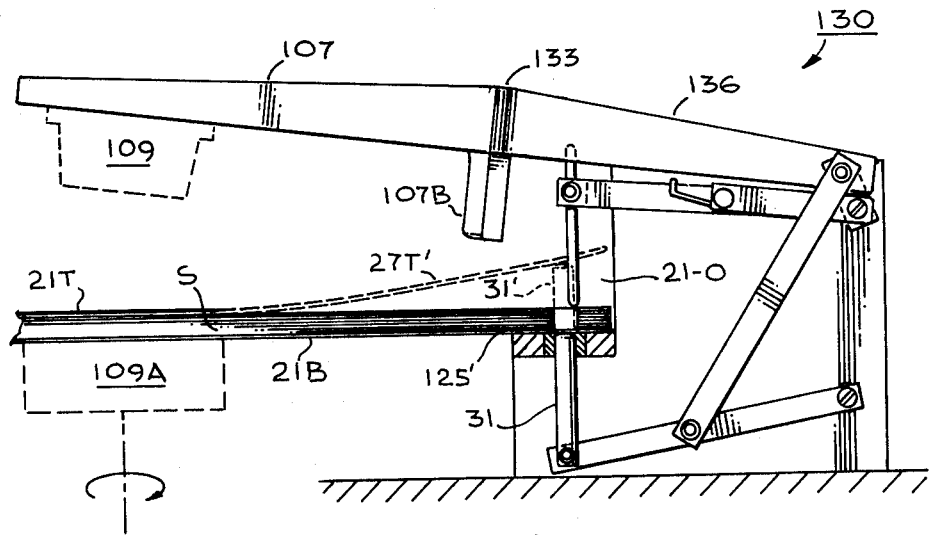
FIG. 12 is a similar view of an automatic jacket opening means likewise adapted for such a disk pack and suited for incorporation in such a drive.

Thus, such a modified disk drive as shown in FIGS. 9 and 11, while otherwise constructed and operating as known in the art, will be understood to include modifications required in order to make advantageous use of the novel disk pack and jacket of the present invention, such as, for example, jacket-opening spreading means (FIGS. 7, 8 and 12); pack rotation (vs. disk rotation) means (FIG. 6); pack partitioning means (FIGS. 3, 6 and 11) and an associated transducer assembly (FIG. 6). The pack-rotating spindle will be understood as being controlled to rotate the pack to any one of several angular orientations (one associated with the accessing of each disk in the pack) for partitioning, and is preferably operated with a motor adapted to be stepped by prescribed precise constant increments, representing digital control to step the pack by precise angular increments to any selected partition-orientation (see details in U.S. Ser. No. 711,647).

Partitioning is effected, preferably by a prescribed parition subassembly 140 including a select plunger (see plunger P in FIGS. 6 and 11) disposed to be thrust upward through an accommodating aperture 123 in working surface 125, upon actuation by an associated solenoid SOL. That is, as will be understood from FIG. 11, a "partition-signal" applied to energize the solenoid coil will act to pull a "clapper arm" A-1 down (against return spring 25) and throw an associated plunger-linkage (arms A-2, A-3 pivotably mounted at pivot $p_v$ on the chassis) downward and thereby thrust plunger P upward, as indicated in phantom in FIG. 11. This partition assembly will be recognized as particularly compatible with the subject "floppy pack" and with unit 100 to perform the select partitioning function of the jacket-encapsulated pack in the above indicated manner.

According to a related feature, spindle drive motor 121 is adapted to rotate the pack, disposed within the jacket J and engaged between hub 109 and drive spindle 109-A, for transducing, as known in the art, as well as to shift according to a related improvement feature, into a second rotary-step mode for partitioning-positioning. That is, responsive to a prescribed indexing (digital) control signal, motor 121 will digitally step the spindle and pack rotationally by a prescribed precise number of integral angular increments until the selected "partition orientation" (i.e., rotation) is achieved. Thus, in effect, the pack is made to step from "zero" (or "Start Radius", see index hole 1-I$h$ and axis A$_X$-1, FIG. 3) a prescribed number of "angular steps" to thereby "count" its way, digitally, to a prescribed locator hole position. Here, a plunger P may thrust the pack to partition it and expose the corresponding selected disk recording surface, as described above. For instance, in this embodiment it is convenient to step-rotate the pack 1.8° per digital "stepping pulse" using a dual mode motor, so that, with the locator holes (embodiment of FIG. 3) separated at 18° intervals, each rotary increment of 10 steps will carry the pack 18°, i.e., from one locator hole to the next.

Thereupon, the transducer carriage means (see step translation motor 111) may be activated to initiate head-entry into the so-partitioned pack (from an outer reference position) while the partitioning plunger P is conjunctively withdrawn. Carriage-entry will thrust the transducer down upon the selected disk surface and will allow the distal end of the transducer mount, and particularly shroud 13 mounted thereon, to contact and assume support of the upwardly-thrust portion of the pack. Shroud 13 will maintain this contact, guidingly, while the pack is rotated and the Read/Write operations are performed.

That is, stepping motor 111 will translate the transducer head into the split pack and place it in compliant "gliding" contact with the selected recording surface of the disk for transducer operation (e.g., see U.S. Pat. No. 3,810,243 for typical operations). Upon completion of the transducing operations, at one or several tracks, the head may be withdrawn and a different recording surface (disk) accessed in another partitioning cycle. The indicated novel partitioning and head mount arrangements will be seen as establishing stable, protected transducer positioning at any selected disk surface of such a flexible pack.

According to this feature, the transducer is kept disk-engaged while moving from track to track on the selected recording surface, until it is entirely disengaged and withdrawn to the outer "rest position" (FIG. 6). During partitioning and transducer entry, the rotary drive will, of course, hold the pack in fixed position, being thereafter rotated (at 360 rpm) for transducer operation, with the "upper" deflected disks (above the selected one) being bent smoothly up over the mentioned shroud 13, as they pass over the transducer carriage 117.

Shroud 13 is configured, positioned and adapted, according to a related feature, to smoothly, frictionlessly guide and urge these "upper disks" (above the split) thus upward, while they are so rotated to permit the unimpeded, non-damaging entry and withdrawal of the transducer mount into, and out of, the split-pack (e.g., for Read/Write operations at different disk tracks).

Workers in the art will appreciate that with such a select/partitioning means, operable in conjunction with such a hole-encoded flexible disk pack, the pack may be split to expose any selected disk, conveniently, yet precisely — e.g., simply rotating the pack to a prescribed angular position corresponding with registry of the plunger with the associated partitioning pattern of locator-holes, then thrusting the plunger up these locator-holes sufficient to admit entry of the transducer-shroud. Thereupon the plungers are retracted and rotation of the pack may be resumed.

Thus, for instance, when the "nth" disk in a pack is selected, the pack will be rotated to "START" position (index hole reference), then stepped by ($n \times 18°$), the angular increments corresponding with a rotation of the pack so that the associated locator-sites register with the plunger-locus. Up-thrust of the plunger will then lift all disks "above n" away from the upper surface of "n" disk, exposing the latter for transducer entry as described. For instance, as workers know, such a stepping motor/lead screw arrangement can position the transducer head on any one of about 77 discrete track positions of a disk surface. Unexpectedly the "paper thin" disks can interfit slidingly while rotating, yet appear to experience minimal frictional wear and damage at the contacting surfaces, especially when protected by the mentioned flexible inter-liner means.

Workers will recognize that other related partitioning means may be employed within the spirit of the subject feature. For instance, a "double" partition may alternatively be invoked, with the floppy pack directed away from the selected disk on both sides thereof (rather than just one side — e.g., to be able to access this disk with two opposed transducer mounts and so facilitate a two-surface transducer capability, while eliminating problems associated with varying head/contact pad pressure due to varying numbers of intervening disks). As accommodating pattern of partition holes and transducer mounts would, of course, be provided in such a case (e.g., the mounts would bias the selected disk opposingly against one another). Also, two pairs of opposed plungers would preferably be provided, one on each side of the entry-path from the transducer mount, these apt for locating the selected disk (sector) between entering transducers — these being provided in a form (not shown) evident to workers.

--Conclusion:

In summary, workers in the art will recognize that the foregoing described embodiments are well adapted to provide novel, unobvious improvements in multi-disk media, as well as associated manufacturing methods — especially for flexible disks — plus protective jacket means and disk handling means including jacket spreaders and pack-partitioning arrangements according to the invention. Workers will also recognize that, while a particular disk handling embodiment has been described, for clarity, the subject novel flexible cartridges (i.e., novel disk packs and associated jacket) are entirely feasible for use with other disk handling arrangements, especially where these include the same or similar jacket spreading and pack-partitioning means. For instance, workers will recognize that, instead of the described partitioning means operating about the circumferential periphery of the disk pack, a like arrangement may be provided to operate closer to the center of the pack such as upon like encoded holes arranged about an inner disk track.

That is, a series of hole-encoded collars may be substituted (no hole-encoding of disks), each supporting a respective disk in a pack and removably coupled (e.g., by key-way means) to a common hub, or spindle, with a similar plunger means being arranged to be thrust up through this stack of collars and deflect (upward) those "above" a given selected disk. Such an arrangement may be more apt for rigid disks.

Similarly, conventional flexible disk records, unperforated with "locator-holes", may be used instead together with flexible interliner disks, bearing the peripheral locator-hole code above described about their periphery (— this hole-locus preferably lying beyond the periphery of the record disks). Thus, the plunger-deflector mechanism may operate upon these interliners rather than the record disks.

Moreover, whereas the illustrative partitioning and-/or jacket opening means are mechanical, it will be apparent that alternate means such as pneumatic or hydraulic partitioning means will in certain cases also serve. For instance, one could substitute a gas injection tube for the mechanical plunger of the indicated partitioning arrangement and propel a burst of pressurized gas up through a selected registered group of locator-holes, as understood and appreciated by workers, under proper circumstances to (at least partially) partition the pack sufficient to allow transducer entry — in certain cases this will even reduce associated abrasion and defacement of disk surfaces as well as accelerate partitioning. One can introduce pressurized gas from inside a spindle hub adjacent the partitioning plane so that, in case the disks are not rigid enough at their periphery once their hubs are raised to the reference plane, application of a stream of pressurized gas can then proceed radially out to maintain them raised. Then, once the

UNITED STATES PATENT OFFICE
CERTIFICATE OF CORRECTION

Patent No. 4,086,641                Dated April 25, 1978

Inventor(s) Herbert Underwood Ragle and Dean DeMoss

It is certified that error appears in the above-identified patent and that said Letters Patent are hereby corrected as shown below:

Col. 2, line 14, change ""dual-size" to —"dual-side—.
Col. 6, lines 49–54, the original alignment of rows and columns in Table IV should be observed as follows:

TABLE IV

| Slit Sites: | • | • | • | • | • | • | • | • | • | • |
|---|---|---|---|---|---|---|---|---|---|---|
| Disk No.: 10' , | $10/_1$ | $10/_2$ | $10/_3$ | $10/_4$ | $10/_5$ | $10/_6$ | $10/_7$ | $10/_8$ | $10/_9$ | $10/_{10}$ |
| 9' : | $9/_2$ | $9/_3$ | $9/_4$ | $9/_5$ | $9/_6$ | $9/_7$ | $9/_8$ | $9/_9$ | $9/_{10}$ | $X_{(1}$ |
| 8' : | $8/_3$ | $8/_4$ | $8/_5$ | $8/_6$ | $8/_7$ | $8/_8$ | $8/_9$ | $8/_{10}$ | $X_{(1}$ | $X_{(2}$ |

Col. 18, line 28, change "$bb^\circ = h\,aa^\circ$" to —$bb^\circ = k\,aa^\circ$—.

Signed and Sealed this

Twelfth Day of September 1978

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,086,641           Dated April 25, 1978

Inventor(s) Herbert Underwood Ragle and Dean DeMoss

It is certified that error appears in the above-identified patent and that said Letters Patent are hereby corrected as shown below:

Col. 2, line 14, change ""dual-size" to --"dual-side--.
Col. 6, lines 49-54, the original alignment of rows and columns in Table IV should be observed as follows:

TABLE IV

| Slit Sites: | • | • | • | • | • | • | • | • | • | • |
|---|---|---|---|---|---|---|---|---|---|---|
| Disk No.: 10' , | $10/_1$ | $10/_2$ | $10/_3$ | $10/_4$ | $10/_5$ | $10/_6$ | $10/_7$ | $10/_8$ | $10/_9$ | $10/_{10}$ |
| 9' , | $9/_2$ | $9/_3$ | $9/_4$ | $9/_5$ | $9/_6$ | $9/_7$ | $9/_8$ | $9/_9$ | $9/_{10}$ | $X_{(1}$ |
| 8' : | $8/_3$ | $8/_4$ | $8/_5$ | $8/_6$ | $8/_7$ | $8/_8$ | $8/_9$ | $8/_{10}$ | $X_{(1}$ | $X_{(2}$ |

Col. 18, line 28, change "$bb^\circ = h\,aa^\circ$" to --$bb^\circ = k\,aa^\circ$--.

Signed and Sealed this

Twelfth Day of September 1978

[SEAL]

Attest:

RUTH C. MASON  
Attesting Officer

DONALD W. BANNER  
Commissioner of Patents and Trademarks